(12) United States Patent
Ferry et al.

(10) Patent No.: US 8,834,974 B1
(45) Date of Patent: Sep. 16, 2014

(54) DECORATIVE DECAL AND ADHESIVE SYSTEM FOR APPLICATION TO VULCANIZED RUBBER ARTICLES

(71) Applicants: Keith George Ferry, Burbank, CA (US); Jason Michael Busch, Los Angeles, CA (US)

(72) Inventors: Keith George Ferry, Burbank, CA (US); Jason Michael Busch, Los Angeles, CA (US)

(*) Notice: Subject to any disclaimer, the term of this patent is extended or adjusted under 35 U.S.C. 154(b) by 30 days.

(21) Appl. No.: 13/874,670

(22) Filed: May 1, 2013

Related U.S. Application Data

(60) Provisional application No. 61/640,768, filed on May 1, 2012.

(51) Int. Cl.
| | |
|---|---|
| *B41M 1/32* | (2006.01) |
| *B41M 3/12* | (2006.01) |
| *B41M 5/00* | (2006.01) |
| *B60C 13/00* | (2006.01) |
| *B44C 1/17* | (2006.01) |
| *B29D 30/72* | (2006.01) |

(52) U.S. Cl.
CPC ............... *B60C 13/001* (2013.04); *B41M 1/32* (2013.01); *B41M 5/0011* (2013.01); *B41M 3/12* (2013.01); *B44C 1/1712* (2013.01); *B29D 2030/728* (2013.01); *Y10S 428/913* (2013.01); *Y10S 428/914* (2013.01)
USPC ........ 428/32.79; 156/240; 427/557; 427/148; 427/152; 427/208.2; 428/913; 428/914

(58) Field of Classification Search
CPC ........ B41M 1/32; B41M 3/12; B41M 5/0011; B44C 1/1712; B60C 13/001; B29D 2030/728
USPC ............... 428/32.79, 913, 914; 427/557, 148, 427/208.2, 152; 156/240
See application file for complete search history.

(56) References Cited

U.S. PATENT DOCUMENTS

| | | | |
|---|---|---|---|
| 4,461,795 A | | 7/1984 | Ogawa |
| 5,198,301 A | * | 3/1993 | Hager et al. ........... 428/355 AK |
| 5,300,164 A | | 4/1994 | DeTrano et al. |
| 5,508,084 A | * | 4/1996 | Reeves et al. ................ 428/172 |
| 6,030,676 A | | 2/2000 | Cottin et al. |
| 6,080,465 A | | 6/2000 | Boissonnet et al. |
| 6,235,376 B1 | | 5/2001 | Miyazaki et al. |
| 6,391,134 B1 | | 5/2002 | Lipovac |
| 7,387,144 B2 | | 6/2008 | Byrne |
| 2010/0092716 A1 | | 4/2010 | Spychalsky |

* cited by examiner

*Primary Examiner* — Bruce H Hess
(74) *Attorney, Agent, or Firm* — Malcolm J. Chisholm, Jr.

(57) ABSTRACT

The system (10) includes at least one elastomeric, vulcanizable ink (18) that defines a decorative decal image (20). The decal image (20) has perimeter edges (22) and a display area (24) extending between the perimeter edges (22). The vulcanizable ink is vulcanized upon a carrier sheet (12). A heat-activated adhesive layer (26) is applied to overlie the display area (24) of the decal image (20), and the heat-activated adhesive layer (26) is also partially activated upon the display area (24) of the decal image (20). The decorative decal image (20) having the partially activated adhesive layer (26) is then thermally transferable to a vulcanized rubber product (28) such as a side wall (30) of an automotive tire (32), after which the carrier sheet (12) is removed.

16 Claims, 3 Drawing Sheets

DECORATIVE DECAL AND ADHESIVE SYSTEM FOR APPLICATION TO VULCANIZED RUBBER ARTICLES

CROSS-REFERENCE TO RELATED APPLICATIONS

This Application claims the benefit of U.S. Provisional Patent application Ser. No. 61/640,768 that was filed on May 1, 2012 entitled "DECORATIVE DECAL WITH ADHESIVE FOR APPLICATION TO VULCANIZED RUBBER ARTICLES".

TECHNICAL FIELD

This disclosure relates to a decorative decal and adhesive system and method for applying the decal and an adhesive to a vulcanized rubber article such as a side wall of an automobile tire.

BACKGROUND ART

It is well known that improving tire sidewalls with decorative lettering and designs is highly sought after in the marketplace for the purposes of aesthetic appearance, safety, product identification, tracking, branding and advertising. Traditional techniques for establishing tire sidewall markings involve extrusion or molding of black rubber and often the addition of colored inks which are cured in parallel with the tire during the vulcanization process. This process, though well established and scaled for industry, requires significant investment in materials, equipment and labor along with sizable wastage costs resulting from voids, blemishes and other defective designs.

In addition, this technique is extremely limiting in terms of customizable designs due to molds and dies required to achieve the desired variations and therefore the availability of this customization to individual consumers and even customers internal to the industry is extremely limited. Examples of appliqués or decals being co-cured with a green tire are found in U.S. Pat. Nos. 4,967,818 and 4,684,420. These methods for providing a decorative sidewall onto a tire add to the processing difficulty and expense of the tire, as discussed hereinabove.

The above mentioned difficulties have brought forth improved techniques for the application of decorative decals by way of a thermal transfer process to a cured tire. The technique of transferring a decal consisting of at least one layer of elastomeric ink with a temporary carrier sheet has been known as early as 1940 from U.S. Pat. No. 2,188,866 and continuously improved with consistent positioning techniques as mentioned in U.S. Pat. No. 6,080,465 as well as improved bonding of materials by way of the additional process step of applying adhesive layers to the tire sidewall prior to thermal transfer of thick, cured rubber articles cut in decorative shapes as disclosed in U.S. Pat. No. 5,300,164. None of the known decorative decals for vulcanized rubber products have reached wide-spread market acceptance. Consequently, there is a need for an efficient decorative decal for vulcanized rubber products that overcomes the deficiencies of the prior art.

SUMMARY OF THE DISCLOSURE

The present disclosure is a decorative decal and adhesive system for application to an exterior surface of a vulcanized rubber article such as a side wall of an automotive tire. The decorative decal and adhesive system include a carrier sheet having a support surface and an opposed exterior surface. At least one elastomeric, colored, vulcanizable ink defines a decal image, and the decal image has perimeter edges and a display area extending between the perimeter edges. The vulcanizable ink is vulcanized upon the support surface of the carrier sheet. A heat-activated adhesive is applied or secured to overlie the display area of the decal image, and the heat-activated adhesive is also partially activated upon the display area. The decorative decal having the partially activated adhesive is thermally transferred to the vulcanized rubber product, after which the carrier sheet is removed.

The disclosure also includes a method of securing the decal image to a vulcanized rubber article by applying the elastomeric, colored, vulcanizable ink to a support surface of a carrier sheet so that the application of the ink defines a decal image having perimeter edges and a display area extending between the perimeter edges upon the support surface of the carrier sheet. The ink is then vulcanized upon the support surface of the carrier sheet. Next, a heat-activated adhesive is applied to overlie the display area of the decal image and is partially activated on the display area of the decal image. Then, the partially activated adhesive, adjacent vulcanized ink, and carrier sheet are thermally transferred to the vulcanized rubber article. Finally, after the thermal transfer, the carrier sheet is removed from the decal leaving the decorative display image displayed upon the vulcanized rubber product, such as a sidewall of an automobile tire.

This invention is an improvement over the known prior art. The present disclosure utilizes durable and visually appealing elastomeric ink layers to form a decorative decal to be applied to a smooth surface or over existing raised surfaces and imperfections of a vulcanized tire sidewall or other vulcanized rubber products without altering the motif or requiring orientation markers to be molded to the tire sidewall or rubber product. Further, the present decorative decal is preferably prepared with a b-staged layer of adhesive that maintains elasticity along with the decal and with the deformations of the tire surface and thus eliminates additional process steps for adhesive application as well as time and cost. Also, the present disclosure allows for the removal of the decal by re-heating the decal to remove it without permanent damage to the tire sidewall which minimizes the cost of a defective decal or poor application solely to the price of the decal.

Prior to providing the details of the invention, it is emphasized that the following descriptions, images and operating parameters are simply preferred ranges provided for illustrative purposes rather than defining limitations of the invention and those skilled in the art may combine or remove elements or extend beyond the defined ranges and still remain within the structure of the invention.

The core of this invention is a system and method for developing a decorative decal assembly having a carrier sheet with at least one color, elastomeric, vulcanizable ink in a form of a predetermined motif or display image with a heat-activated adhesive overlying the decal image, and the technique for applying the said decorative decal image to vulcanized rubber. The invention improves upon the identified drawbacks of existing inventions and requires from a user only a method for performing a thermal transfer of the decorative decal consisting of vulcanized ink on the display area of the decal image and b-staged adhesive from the carrier sheet.

DETAILED DESCRIPTION OF THE PREFERRED EMBODIMENTS

Figure 1:
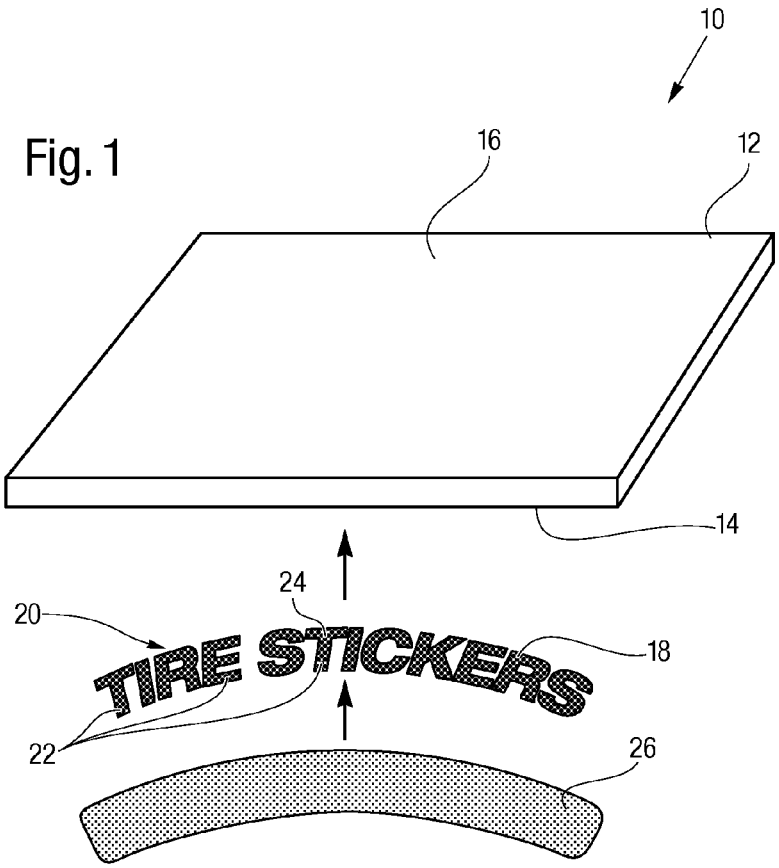
FIG. 1 is a simplified perspective view of a carrier sheet showing a decorative decal image and an adhesive layer disposed below a support surface of the carrier sheet.
Figure 2:
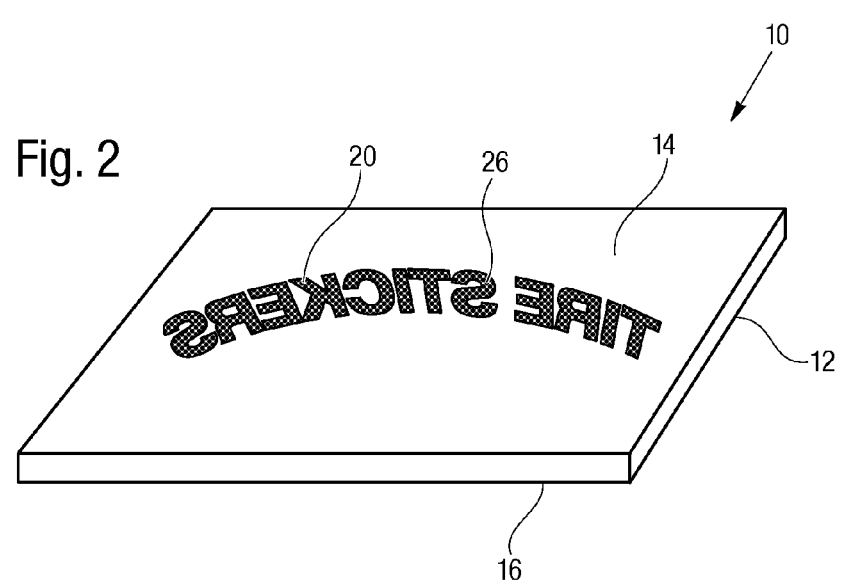
FIG. 2 is a simplified perspective view of the FIG. 1 carrier sheet, showing the FIG. 1 decorative decal image and adhesive layers applied to the support surface of the carrier sheet and rotated so that the decorative decal is facing upward and showing a mirror-image of the decorative decal.

Referring to the drawings in detail a decorative decal and adhesive system for application to an exterior surface of a vulcanized rubber product or article is shown in FIGS. 1 and 2 and is generally designated by the reference numeral 10. The decorative decal and adhesive system 10 includes a carrier sheet 12 having a support surface 14 and an opposed exterior surface 16. At least one elastomeric, colored, vulcanizable ink 18 defines a decal image 20, and the decal image has perimeter edges 22 and a display area 24 extending between the perimeter edges 22. The vulcanizable ink 18 is vulcanized upon the support surface of the carrier sheet 12. A heat-activated adhesive 26 is applied to overlie the display area 24 of the decal image 20, so that the adhesive 26 is about contiguous with the perimeter edges 22 of the decal image 20 and completely overlies the display area 24 of the decal image 20. By the phrase "about contiguous with", it is meant that the adhesive preferably coats the entire vulcanized ink 18 decal image 20 with a plus or minus 1.5 millimeter ("mm") extension within or beyond the perimeter edges 22 of the decal image 20. This tolerance is intended to provide a user with a seamless bond (+1.5 mm) when applied to the vulcanized rubber or to allow for easy removal (−1.5 mm), or to account for adhesive seepage when pressure is applied during the thermal transfer process. The heat-activated adhesive 26 is also partially activated upon the display area 24 of the decal image 20. As described in more detail below with respect to FIGS. 5, 6 and 7, the "heat-activated adhesive" may be characterized as an adhesive system including several forms of application of adhesives within the system, wherein all of the forms of the system include at least one layer of a heat-activated adhesive 26. Also disclosed below is a temporary, non-thermoset adhesive, single tacky pressure-sensitive adhesive layer variation, wherein a single tacky layer is applied to the decal image 20 upon the carrier sheet 12 for temporary display of the decal image.

By the phrase "vulcanizable ink 18", it is meant that upon raising the temperature of the ink 18 above a pre-determined temperature, compounds within the ink 18, form cross-link molecular bonds between adjacent carbon chains to thereby increase a strength of a bond between the compounds making up the ink 18, and to also form adhesive bonds with an adjacent carbon-based material, such as the carrier sheet 12.

By the phrase "heat-activated adhesive 26" it is meant that upon raising the temperature of the adhesive above a pre-determined temperature, compounds within the adhesive 26 partially leave the adhesive 26 and form cross-link molecular bonds with carbon chains within adjacent carbon-based materials to thereby increase a strength of a bond between the adhesive 26 and the adjacent carbon-based material. By the phrase "partially activated", it is meant that a heat-activated adhesive has pressure and/or heat applied to the adhesive adequate to initiate activation of the adhesive, but inadequate to complete activation of the adhesive. For example, the heat-activated adhesive 26, upon application to the ink decal 20, after an initial heating forms cross-link bonds first with carbon chains within the ink 18, and will later, upon further heating, form cross-link bonds with carbon chains within a vulcanized carbon product 28, such as a side wall 30 of an automotive tire 32, when the decorative decal and adhesive system 10 is thermoset to the side wall 30 of the tire 32.

Figure 3:
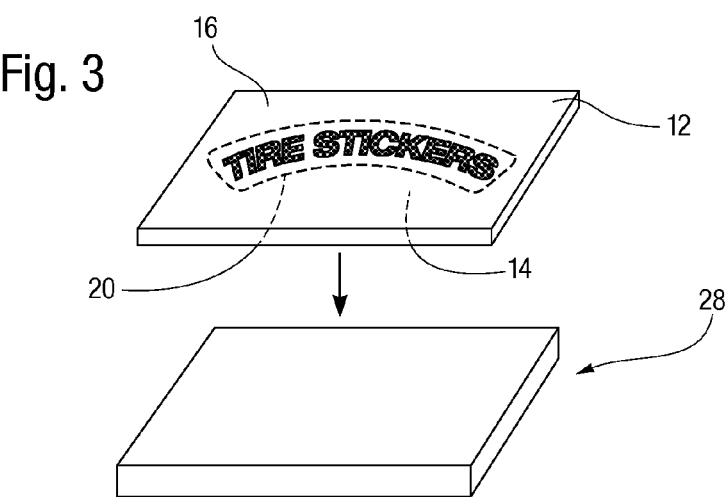
FIG. 3 is a simplified perspective view of the FIG. 2 carrier sheet showing the decal image in hatch lines to represent its location on the support surface of the sheet adjacent a vulcanized rubber product.

The decorative decal and adhesive system 10 includes a method of thermal transfer of the decal image 20 to the vulcanized rubber product 28, after which the carrier sheet 12 is removed. FIG. 3 shows the ink 18 in the form of the decal image 20 along with the partially activated adhesive 26 secured to the support surface 14 of the carrier sheet 12. It is noted that FIG. 3 shows the carrier sheet 12 flipped 180 degrees from, or as a mirror image of the FIG. 2 view. That is because FIG. 2 shows the support surface 14 as the upper surface of the carrier sheet 12 that supports the decal image 20.

Figure 4:
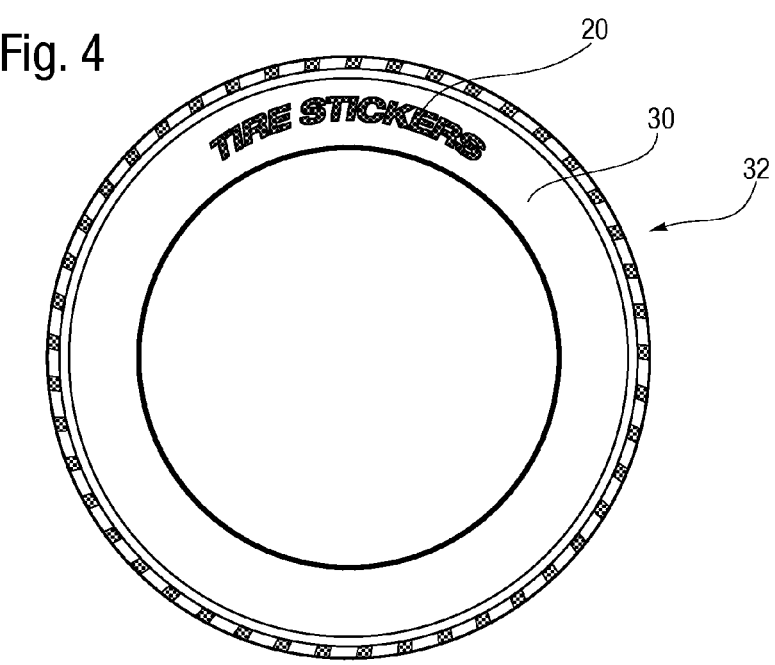
FIG. 4 shows a simplified flat plan view of the FIG. 3 decal image transferred and secured to a tire sidewall of the FIG. 3 vulcanized rubber product.

FIG. 3 shows the carrier sheet 12 in the same orientation as the FIG. 1 view, and shows the decal image 20 surrounded by hatched line to indicate that the decal image 20 is secured to the support surface 14 above the vulcanized rubber product 28 to which the decal 20 would be applied by thermal processing. FIG. 4 shows the decal image 20 applied to a sidewall 30 of an automotive tire 32.

Figure 5:
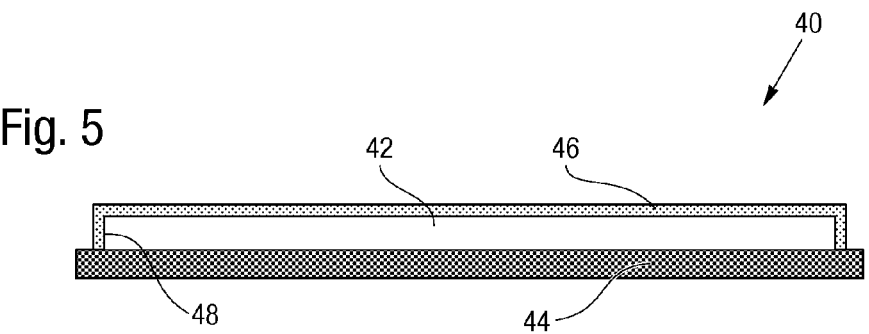
FIG. 5 shows a simplified, cross-sectional view of a first alternative or a single-layer adhesive system applied to a decal image and carrier sheet of the present invention.

FIG. 5 shows a simplified, cross-sectional view of a first alternative 40 or a single-layer adhesive variation 40 of the system 10. The single-layer adhesive variation 40 shows a single heat-activated adhesive layer 46 applied to a second decal image 42 that has been secured to a second carrier sheet 44. The single layer of heat-activated adhesive 46 is applied so that the adhesive 46 is about contiguous with perimeter edges 48 of the second decal image 42.

Figure 6:
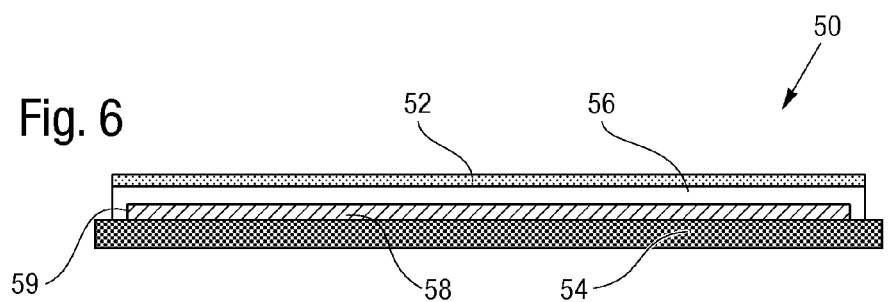
FIG. 6 shows a simplified, cross-sectional view of a second alternative or a double-layer adhesive system applied to a decal image and carrier sheet of the present invention.

FIG. 6 shows a simplified cross-sectional view of a second alternative 50 or a double-layer adhesive variation 50 of the system 10. The double-layer adhesive variation 50 shows a first heat-activated adhesive layer 52 that is farthest from a third carrier sheet 54. A second layer of a tacky adhesive 56 is first applied to cover a third decal image 58, and both layers of adhesive 52 and 56 or at least the heat-activated adhesive layer 52 are applied to be contiguous with perimeter edges 59 of the third decal image 58. By the phrase "tacky adhesive" herein, it is meant that the "tacky adhesive" is any pressure sensitive adhesive that may be applied to a surface and leave a "tacky" feel, such as common, pressure sensitive "SCOTCH" brand adhesive tape rolls, masking adhesive tape rolls, etc. The tacky adhesive second layer 56 facilitates handling of the third decal image 58 and third carrier sheet 54 between applications of the ink and adhesive to the double-layer adhesive variation 50 of the system 10.

It is pointed out that the tacky adhesive in this double-layer adhesive variation 50 is primarily for use with heat-activated adhesives 52 that are not applied during the printing of the vulcanizable ink forming the third decal image 58. If the first heat-activated adhesive layer 52 can be applied immediately after application of the ink forming the third decal image 58, the single-layer adhesive variation 40 shown in FIG. 5 would be produced. The heat-activated adhesive layer 52 may be subjected in alternative manufacturing processes including a secondary manufacturing step referred to as "B-Staging". B-Staging involves application of a predetermined level of heat to the adhesive layer 52 to remove a majority of solvent from the adhesive to thereby partially activate the adhesive to facilitate application of the adhesive to the rubber object 28, while the heat-activated adhesive layer retains limited flexibility and elasticity. However, instead of using a B-Staging process, the tacky adhesive layer 56 may be applied to eliminate the need for B-Staging the thermoset, heat-activated adhesive layer 52, thereby producing the double-layer adhesive variation 50 of the system 10.

Upon thermosetting of the vulcanizable ink layer 52 on the vulcanizable rubber product 28 as described below, the tacky adhesive layer 56 is primarily volatilized and plays little or no part in adhering the decal image 58 to the rubber product 28.

Figure 7:
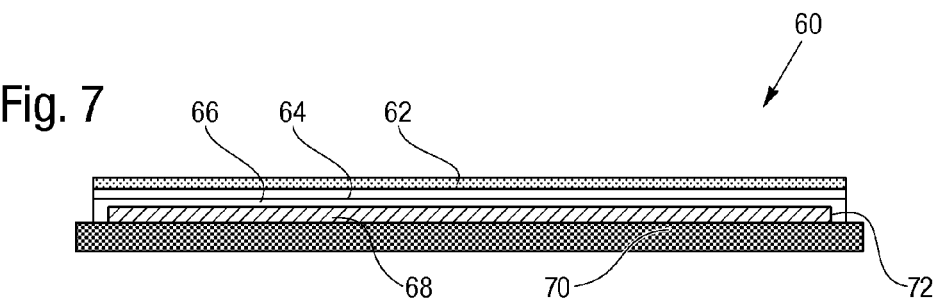
FIG. 7 shows a simplified, cross-sectional view of a third alternative or a triple-layer adhesive system applied to a decal image and carrier sheet of the present invention.

FIG. 7, shows a simplified, cross-sectional view of a third alternative 60 or a triple-layer adhesive variation 60 of the system 10. The triple-layer adhesive variation 60 shows an outer tacky adhesive layer 62 overlying an inner heat-activated adhesive layer 64 and a second tacky adhesive layer 66 between the inner heat-activated adhesive layer 64 and a fourth decal image 68 applied to a fourth carrier sheet 70. Both of the tacky adhesive layers 62, 66 and the inner heat-activated adhesive layer 64, or at least the inner heat-activated adhesive layer 64, are applied to be contiguous with perimeter edges 72 of the fourth decal image 68. As discussed above, the second tacky adhesive layer 66 assists in handling of the decal image 68 and carrier sheet 70 as described above regarding the double-layer adhesive variation 50. The outer tacky adhesive layer 62 facilitates application of the decal image 68 to the rubber product, such as a vulcanized rubber tire 32 side wall 30 (shown in FIG. 4).

For example, the triple-layer adhesive variation 60 of the system 10 may be applied to a tire 32 side wall 30 while the tire 32 is mounted in a vertical position, such as mounted upon a vehicle (not shown). This greatly facilitates use of the system 10 and provides great flexibility in usage, especially on performance vehicles that may have valuable tires locked onto wheels (not shown). This will also enable the user to properly place the assembly 60 in a location on the vulcanized rubber article 28 that is aesthetically appealing and geometrically correct. This option is a replacement for the need to cut positioning systems into the carrier sheet 70 or have raised surfaces molded into the vulcanized rubber article 28 intended for proper decal placement as referenced in the aforesaid U.S. Pat. Nos. 6,080,465 and 5,904,794.

It is pointed but that a temporary, non-thermoset adhesive variation of the system 10 includes a single tacky layer 66 applied to the decal image 68, and may be utilized without the additional heat-activated adhesive layer 64 and exterior tacky layer 62. Such a temporary, single tacky layer 66 variation may be useful for applying the decal image 68 to a tire 32 sidewall 30 for advertising or display purposes, wherein the decal image 68 formed by the vulcanizable ink layer 68 is not exposed to stresses of normal tire usage. The tacky adhesive 66 for the temporary variation is to be a pressure sensitive adhesive with a bond strength established between the tacky adhesive layer 66 and vulcanized rubber article 28 exceeding a bond strength between the vulcanized ink decal image layer 68 and the carrier sheet 70 in order to release the decal image 68 onto the vulcanized rubber article 28. One such adhesive selection is available from Fastel Adhesives Company, of San Clemente, Calif., U.S.A. and is sold by the model name and number "FASTELTACK DC 4.5R". Such temporary assembly of the carrier sheet 70, decal image 68 and tacky adhesive layer 66 can be placed onto the vulcanized rubber article 28, and then hand pressure applied to the carrier sheet 70. The carrier sheet 70 can then be removed leaving the decal image attached to the rubber article 28. This temporary assembly 70, 68, 66 variation of the system 10 is an ideal solution for temporary displays and static conditions of the vulcanized rubber article 28 such as advertising displays, car shows, and similar situations.

The vulcanized ink 18 and the preferably b-staged adhesive 26 are formulated to adhere more strongly to the vulcanized rubber object 28, 30 than to the support or carrier sheet 12 after thermal transfer and cooling at which point cross-linking of said ink 18 or inks and adhesive 26 layers occurs. By referring to the carrier sheet 12 as a temporary support, it is to be understood that the carrier sheet 12 is made in the form of a thin thermally resistant sheet adapted to receive at least one colored ink 18 on its support surface 14 in a mirror image format for the making of the decal image 20. The carrier sheet 12 or temporary support is removed after the operation of transfer of the ink 18 and adhesive 26 onto the article of vulcanized rubber 28.

The decal image 20 in accordance with the disclosure 10 can be produced by printing techniques such as screen printing one or more vulcanizable elastomeric colored inks in a predetermined design or multiple designs upon the carrier sheet 12 such as sheets made of ethylene polyether-phthalate (PET), aluminum, or "MYLAR" brand stretched polyester film. For the support of a decal image 20 there is preferably selected a material for the carrier sheet 12 that can be made in the form of a thin sheet which can be subjected to a range of molding temperatures between 100 degrees Celsius "° C." and 300° C. so that the carrier sheet 12 can follow and adopt, in its smallest details, any surface geometry (not shown) of the vulcanized article 28 on which the decal is placed.

Upon vulcanization of the colored ink(s) 18 to the carrier sheet 14, a heat-activated adhesive that may be selected from the group consisting of urethane, cyanoacrylate, epoxy, polyvinyl alcohol, acrylate, methacrylate, polyvinyl chloride and polyester, is then applied to the exposed vulcanized ink(s) 18 in techniques such as screen printing, coating or manual application of pre-cut adhesive film. Regardless of the technique employed for adhesive application, the adhesive should coat the entire vulcanized ink(s) 18 decal image 20 with a plus or minus "+/−" 1.5 mm tolerance at all borders of the image 20.

Once applied, the carrier sheet 12 with vulcanized ink decal image 20 and adhesive combination may undergo an additional process in order to B-stage the adhesive layer 26. As described above, B-staging is the technique of utilizing UV light or heat to remove a majority of a solvent from an adhesive in order to support assembly while maintaining adhesive performance. Depending on the adhesive selected, this process can be performed by subjecting the combination to temperatures ranging from room temperature to about 85° C. and durations ranging from 30 seconds to 2 hours. (For purposes herein, the word "about" is to mean plus or minus 15%.) It is critical not to subject the adhesive layer 26 to conditions that establish a full cure in order to preserve the integrity of the decal image 20 bond to the vulcanized rubber article 28.

Once the vulcanized ink(s), b-staged adhesive layer 26, or tacky adhesive layer 62 and support sheet 12, 70 assembly are established, the thermal transfer of the ink 18 and heat-activated adhesive 64 from the carrier sheet 12, 70 to the vulcanized rubber article 28 is achievable.

Thermal transferring means a process that makes it possible to transfer onto the surface of an article of vulcanized rubber, such as onto a side wall 30 of a tire 32, the decal image 20 and adhesive layer 26 which have been previously formed on the carrier sheet 12. The thermal transfer process includes, after having placed the adhesive layer 26 in contact with side wall 30, exerting a pressure on the carrier sheet 12 while contributing sufficient heat to effect the transfer of the decal image 20 onto the side wall 30. Examples of thermal transfer devices include a standard household iron (not shown) or mechanical heat press machines (not shown). The pressures and temperatures used in such a process are between 0.2 and 5 bars and between about 75° C. and 200° C.

The thermal transfer process is well-adapted to the transfer of the decal image 20 onto the vulcanized molded tire 32 and completes adhesive activation to establish the described disclosure. The disclosure enables precise and lasting placement of the decal image 20 as well as the option to completely remove the image 20 from the vulcanized rubber by re-heating the image 20, and replacing it if so desired, without damaging effects to the rubber.

The phrase "vulcanizable ink 18" as used herein means an ink 18 having an adequate elasticity to follow any deformations of the side wall 30 of the article such as the tire 32 onto which the decal image 20 has been transferred and during the full range of conditions of use of the tire 32. Recommended elasticity of the vulcanizable ink 18 is about 500%. The "vulcanizable ink 18" described herein also requires that once vulcanized on the rubber side wall 30, the decal image 20 must have resistance to ultra violet ("UV") light, abrasion, environmental conditions such as heat, rain, snow and other forms of degradation. An exemplary vulcanizable ink is available from suppliers such as Union Process from Akron, Ohio, under the brand name silkscreen 800 series ink; is also available from the Yuancheng company of Guangdong China as a rubber-solvent based ink available as Model PI-12; and, is also available from APV Engineered Coatings company of Akron, Ohio, under the product name "T-series transfer inks". Preferable thickness of the decal image 20 is between about 0.15 and about 5 mils, or between about 0.003 and about 0.127 mm. The vulcanization temperature range is preferably between about ambient room temperature to 250° C. depending on duration of time and vulcanization technique selected. Acceptable vulcanization methods include air drying, hot air drying, UV light or other heating techniques know in the art.

The carrier sheet 12 capable of receiving the curable elastomeric ink by way of printing technique as well as the adhesive layer and must be thermally resistant to temperatures of at least 250° C. The carrier sheet 12 is intended to serve as a temporary support during the vulcanization process of the ink layer 18, any b-staging of the adhesive layer 26, and transportation of the sheet 12, decal image 20 and adhesive layer 26 attached to the sheet 12 until final application to the vulcanizable rubber article 28 is required. The carrier sheet 12 must be thin and flexible enough to conform around raised surfaces on the rubber article in order to enable the decorative decal image 20 to conform around any irregular side wall surfaces 30 when thermally transferred in order to not weaken the bond to the rubber side wall 30.

The heat-activated adhesive 20 selected is of critical importance for the invention 10 in that it must be capable of withstanding thermal transfer conditions where heat, time and pressure occur without compromising the integrity of the bond or creating unsafe conditions for the applicant of the decal. Ideally, the "heat-activated adhesive 26" includes a heat activated, thermoset or thermoplastic adhesive capable of b-staging the adhesive to the decal image 20 during production of the invention to later be fully activated during the application of the decal image to the side wall 30. The heat-activated adhesives 26 for the purposes of this disclosure include "ARclad IS-7970" brand adhesive from Adhesives Research company of Glen Rock, Pa.; Fastelset-NT brand thermoset thermoplastic and Fastelset-X brand thermoset epoxy film adhesives from Pastel Adhesives company of San Clemente, Calif.; pressure sensitive adhesive (described above as "tacky adhesives" and thermoset adhesive combinations which enable improved manufacturing efficiency and vertically oriented thermal transfer application described include adhesive products such as FastelFilm LT and HT in the following model numbers of various phase-changing temperatures (15066, 16071, 20093, 230110), from Fastel Adhesives company of San Clemente, Calif.

B-staging is the technique of utilizing UV light or heat to remove the majority of a solvent from an adhesive in order to support assembly while maintaining adhesive performance. This process does not fully activate the adhesive but rather establishes a bonding condition with a component thus creating an assembly. Recommended B-staging conditions 50° C. to 85° C. in order to not degrade the strength of the adhesive once fully activated.

Curing of the heat-activated adhesive 26 can occur at temperatures in excess of 75° C. however the integrity of the adhesive begins to diminish as heat exceeds 150° C. for extended durations. Curing occurs when the heat-activated adhesive is subject to the aforementioned temperatures for durations between about ten seconds and about three minutes depending on the temperature selected. Preferred heat-activated adhesive activation or curing occurs at temperatures between about 75° C. and about 150° C. for a duration of between about five seconds to about one minute.

Producing too thin of an adhesive layer 26 reduces the strength of the bond between the vulcanized decal image 20 and cured rubber side wall surface 30, thus making the decal insufficient for required operating conditions. Excessive adhesive layer 26 thickness creates leakage beyond the decorative ink layer's outer edges which creates an undesirable appearance to the finished product as well as difficulty when removing the carrier sheet 12. In addition, excessive adhesive creates a gap between the vulcanized ink 18 and cured rubber side wall surface 30 that increases the likelihood of peeling, cracking or susceptibility to abrasion of the decal image 20 during use of the tire 32. A preferred thickness for the adhesive layer 26 is between about 1 mils (0.0254 mm) to about to 3 mils (0.0762 mm).

A technique for application of the adhesive layer 26 is not critical because it only impacts the scalability and efficiency of the manufacturing process. However, the surface area on the vulcanized ink layer decal image 20 to which the adhesive layer 26 must be coated over is critical in providing ideal adhesion of the decorative decal image 20 with the cured rubber side wall surface 30 and preventing damage due to abrasion or likelihood of peeling edges of the image 20. The adhesive layer 26 should cover the entire surface 24 of the decorative vulcanized ink decal image layer 20 at minimum and it preferably extends beyond the perimeter edges 22 of the decal image 20 to create a seamless transition between the cured rubber article side wall surface 30 and the vulcanized ink decal image 20. Extending the adhesive layer 26 too far beyond the perimeter edges 22 increases the likelihood of undesired bonding to the carrier sheet 12 as well as an unsightly appearance on the cured rubber side wall surface 30. Therefore, a preferred range for the adhesive layer to extend beyond the borders of the vulcanized ink decal image 20 no greater than about 1.5 mm.

Although the decal image 20 can be applied to a tire side wall 30 without any specific preparation, eliminating dirt and oils from the tire surface create an ideal bond and minimizes any risk of tarnishing the decal color or creating unevenness beneath the decal image 20 surface. Thermal conditions are required to separate the vulcanized ink decal image layer 20 from the carrier sheet 12 as well as to fully activate the adhesive layer as described above. Additionally, adequate cooling time is necessary for these layers to fully cure. Though there is no upper limit for cooling time and leaving the carrier sheet 12 on the tire 32 actually provides a protective layer for transportation of the tire 32, it has been demonstrated that the carrier sheet 12 can be removed in as little as thirty seconds or as much as thirty minutes depending on the temperature selected for thermal transfer. Beyond the carrier sheet 12, vulcanized ink layer decal image 20 and adhesive layer 26, the heat will also transfer into the cured rubber surface and remain for durations often exceeding those of the decorative decal image 20.

While the present disclosure has been presented above with respect to the described and illustrated embodiments of the decorative decal and adhesive system for application to a vulcanized rubber article, it is to be understood that the disclosure is not to be limited to those alternatives and described embodiments. For example, while the vulcanized rubber article is referred to as an automotive tire, the disclosure may be applied to any product capable of partial vulcanization with the heat-activated adhesive and decal image. Accordingly, reference should be made primarily to the following claims rather than the forgoing description to determine the scope of the disclosure.

What is claimed is:

1. A decorative decal and adhesive system for application of a decal image to an exterior surface of a vulcanized rubber article, the system comprising:
   a. a carrier sheet having a support surface and an opposed exterior surface;
   b. at least one elastomeric, vulcanizable ink defining the decal image, the decal image having perimeter edges and a display area extending between the perimeter edges, and the vulcanizable ink decal image being vulcanized upon the support surface of the carrier sheet;
   c. a heat-activated adhesive layer overlying the display area of the decal image, and the heat-activated adhesive layer being partially activated to the display area of the decal image; and,
   d. the carrier sheet, decal image and heat-activated adhesive layer being formulated for thermal transfer of the decal image onto the exterior surface of the vulcanized rubber article by activation of the adhesive layer onto the vulcanized rubber layer and removal of the carrier sheet from the decal image.

2. The decorative decal and adhesive system of claim 1, wherein the heat-activated adhesive layer further comprises a B-Staged heat-activated adhesive layer.

3. The decorative decal and adhesive system of claim 1, wherein the vulcanizable ink is selected from the group consisting of water-based and solvent-based transfer inks.

4. The decorative decal and adhesive system of claim 1, wherein the heat-activated adhesive layer is formed of heat-activated adhesives selected from the group consisting of thermoset, thermoplastic, thermoset epoxy film, adhesives, and pressure sensitive tacky adhesives combined with thermoset and thermoplastic adhesives.

5. The decorative decal and adhesive system of claim 1, wherein the carrier sheet is formed of sheet material selected from the group consisting of ethylene polyether-phthalate, aluminum, stretched polyester film.

6. The decorative decal and adhesive system of claim 1, wherein the system further comprises a double-layer adhesive variation of the system having a tacky adhesive layer applied to overlie and be contiguous with perimeter edges of the decal image between the heat-activated adhesive layer and the decal image.

7. The decorative decal and adhesive system of claim 6, wherein the system further comprises a triple-layer adhesive variation of the system having an outer tacky adhesive layer applied to overlie the heat-activated adhesive layer and be contiguous with perimeter edges of the decal image.

8. The decorative decal and adhesive system of claim 1, wherein the heat-activated adhesive layer overlies the display area and perimeter edges of the decal image by about a plus or minus 1.5 millimeter extension within or beyond the perimeter edges of the decal image.

9. A method of forming a decal image capable of being secured to a vulcanized rubber article, the method comprising:
   a. applying an elastomeric, vulcanizable ink to a support surface of a carrier sheet so that the application of the ink defines a decal image having perimeter edges and a display area extending between the perimeter edges upon the support surface of the carrier sheet;
   b. vulcanizing the elastomeric, vulcanizable ink decal image upon the support surface of the carrier sheet;
   c. then, applying a heat-activated adhesive layer to overlie the display area of the decal image and to be to be contiguous with perimeter edges of the decal image; and,
   d. partially activating the adhesive layer to the display area of the decal image.

10. The method of claim 9, further comprising, after the partially activating the adhesive layer to the display area of the decal image, supporting the heat-activated adhesive layer adjacent the vulcanized rubber article; applying a predetermined amount of heat and a predetermined amount of pressure to the carrier sheet to thermally transfer the heat-activated adhesive layer and decal image to the rubber article; and, then removing the carrier sheet from the decal image.

11. The method of claim 9, wherein vulcanizing the elastomeric, vulcanizable ink decal image upon the support surface of the carrier sheet further comprises raising a temperature of the decal image and support sheet between about thirty degrees Celsius and about three-hundred and fifty degrees Celsius.

12. The method of claim 9, wherein partially activating the adhesive layer to the display area of the decal image further comprises raising a temperature of the adhesive layer, decal image and support sheet to between about thirty degrees Celsius and about eighty-five degrees Celsius for between about thirty seconds to about two hours.

13. The method of claim 9, wherein partially activating the adhesive layer to the display area of the decal image further comprises B-staging the adhesive layer by applying a predetermined level of at least one of ultraviolet light and heat to the adhesive layer to remove a majority of a solvent from the adhesive layer to thereby partially activate the adhesive layer to bond to the decal image while maintaining adhesive potential for the adhesive layer to subsequently bond to the rubber article.

14. The method of claim 9, further comprising forming a double-layer adhesive variation on the carrier sheet by, before applying the heat-activated adhesive layer to overlie the display area of the decal image, first applying a tacky adhesive layer to overlie the decal image, then transporting the carrier sheet, vulcanized decal image and tacky adhesive layer on the decal image from a point of application of the vulcanizable ink and tacky adhesive to a point of application of the heat-activated adhesive layer, and then applying the heat-activated adhesive layer to overlie the display area of the decal image and tacky adhesive and to be to be contiguous with perimeter edges of the decal image.

15. The method of claim 14, further comprising forming a triple-layer adhesive variation on the carrier sheet by, after applying the heat-activated adhesive layer to overlie the tacky adhesive layer and the display area of the decal image, then applying a second tacky adhesive layer to overlie the heat-activated adhesive layer.

16. The method of claim 9, further comprising, after partially activating the adhesive layer to the display area of the decal image, applying a tacky adhesive layer to the partially activated adhesive layer.

\* \* \* \* \*